Nov. 29, 1955 C. J. HULL ET AL 2,725,235

AUTOMATIC PHONOGRAPH

Filed Feb. 5, 1951 9 Sheets-Sheet 1

INVENTORS.
FRED H. OSBORNE.
CHARLES J. HULL.
BY
Lockwood, Hahn, Galt & Woodard.
ATTORNEYS.

INVENTORS.
FRED H. OSBORNE.
CHARLES J. HULL.
BY
Lockwood, Hahn, Galt & Woodard,
ATTORNEYS.

Nov. 29, 1955 C. J. HULL ET AL 2,725,235

AUTOMATIC PHONOGRAPH

Filed Feb. 5, 1951 9 Sheets-Sheet 3

INVENTORS.
FRED H. OSBORNE.
CHARLES J. HULL.
BY
Lockwood, Hahn, Galt & Woodard,
ATTORNEYS.

Nov. 29, 1955 C. J. HULL ET AL 2,725,235

AUTOMATIC PHONOGRAPH

Filed Feb. 5, 1951 9 Sheets-Sheet 4

INVENTORS.
FRED H. OSBORNE.
CHARLES J. HULL.
BY
Lockwood, Hahn, Galt & Woodard,
ATTORNEYS.

Nov. 29, 1955 C. J. HULL ET AL 2,725,235

AUTOMATIC PHONOGRAPH

Filed Feb. 5, 1951 9 Sheets-Sheet 5

INVENTORS.
FRED H. OSBORNE,
CHARLES J. HULL.
BY
Lockwood, Hahn, Galt & Woodard,
ATTORNEYS.

Nov. 29, 1955 C. J. HULL ET AL 2,725,235

AUTOMATIC PHONOGRAPH

Filed Feb. 5, 1951 9 Sheets-Sheet 6

INVENTORS.
FRED H. OSBORNE.
CHARLES J. HULL.
BY
Lockwood, Hahn, Galt & Woodard.
ATTORNEYS.

INVENTORS.
FRED H. OSBORNE.
CHARLES J. HULL.
BY
Lockwood, Hahn, Galt & Woodard,
ATTORNEYS.

INVENTORS.
FRED H. OSBORNE
CHARLES J. HULL.
BY
Lockwood, Hahn, Galt & Woodard,
ATTORNEYS.

INVENTORS.
FRED H. OSBORNE.
CHARLES J. HULL.
BY
Lockwood, Hahn, Galt & Woodard,
ATTORNEYS.

United States Patent Office 2,725,235

Patented Nov. 29, 1955

2,725,235

AUTOMATIC PHONOGRAPH

Charles J. Hull, Eggertsville, and Fred H. Osborne, Snyder, N. Y., assignors to The Rudolph Wurlitzer Company, Chicago, Ill., a corporation Application February 5, 1951, Serial No. 209,476

7 Claims. (Cl. 274—10)

This invention relates to an automatic phonograph of the coin operated type wherein a phonograph record is selectively transferred from a record magazine to a vertically movable turntable for presenting it to a reproducer in playing position.

The invention is an improvement upon and reference may be had to Letters Patent No. 2,002,326, granted May 21, 1935, to Russell I. Wilcox; Letters Patent No. 2,189,-077, granted February 6, 1940, to Howard F. Maurer; and Letters Patent of Fred H. Osborne, Number 2,631,-856, issued March 17, 1953, for "Automatic Phonograph."

It is the object of this invention to mechanically improve upon automatic phonographs of the type disclosed in the above-mentioned application and Letters Patent, and more particularly to provide a phonograph of this character which will selectively reproduce not only one of a plurality of records, but a selected side of a selected record.

It is a further object of the invention to provide a structure which will enable a phonograph of this type to reproduce records of different form and diameter and at different speeds of revolution. Thus, a phonograph may be adapted to reproduce a selected side of a selected record of either the standard ten inch 78 R. P. M. type, the RCA seven inch 45 R. P. M. type, or the Columbia ten inch 33⅓ R. P. M. type.

It is recognized that automatic phonographs of the prior art have heretofore been developed to reproduce a selected side of a selected record through the medium of dual opposed tone arms and reproducers so arranged that one of said reproducers will engage one side of a selected record and the other opposite reproducer engage the opposite side thereof selectively. However, it is the object of this invention to apply such arrangement to a phonograph of the type herein disclosed as above referred to, wherein each of the records in the magazine rests in a tray which is caused to swing laterally from a column of trays and records into vertical alignment with a turntable moving upwardly through the tray to raise the record therefrom and carry it into engaging position with an overhead reproducer. The invention is, therefore, concerned with meeting the problem of so presenting a record from a tray into position for rotating with both sides of its reproducing area exposed and engaged by either an upper or a lower reproducer.

The invention further contemplates, in a phonograph of this character, adapting the record supporting trays to the centering and manipulation of a ten inch record having a small center opening or a seven inch record having either a small or a larger opening, coupled with rotating such records at a selected speed—78 R. P. M., 45 R. P. M. or 33⅓ R. P. M.—either in a clockwise direction, wherein the upper reproducer engages the top of the record, or in the reverse counterclockwise direction, wherein the lower reproducer engages the under side of the record.

Another feature of the invention resides in the provision of a gravity weight positioned to engage and clamp the upper side of the record against the turntable for supporting and retaining the record against displacement through engagement of the reproducer with either the upper side or the under side thereof.

Another feature of the invention resides in the provision of an inertia driving member for driving the turntable spindle and movable therewith into frictional driving engagement with a reversible motor driven driving member, and wherein the direction of drive is automatically determined according to the side of the record to be reproduced, and the speed of driving may be manually established according to the R. P. M. of said record.

Another feature of the invention resides in the structure of the top stabilizing bearing for the turntable spindle when raised upwardly to its record reproducing position.

A further feature of the invention resides in the lower thrust bearing on the turntable lifting lever for slidably receiving the lower end of the turntable spindle.

A further feature of the invention resides in the mechanism controlled by the position of a suitable record selector cam for automatically moving the upper or lower tone arm into record engaging position, depending upon the selected side to be reproduced.

A further feature of the invention resides in the automatic selection of the upper or lower reproducer for record engagement controlled by the record selecting mechanism.

The full nature of the invention will be understood from the accompanying drawings and the following description and claims:

Figure 1:
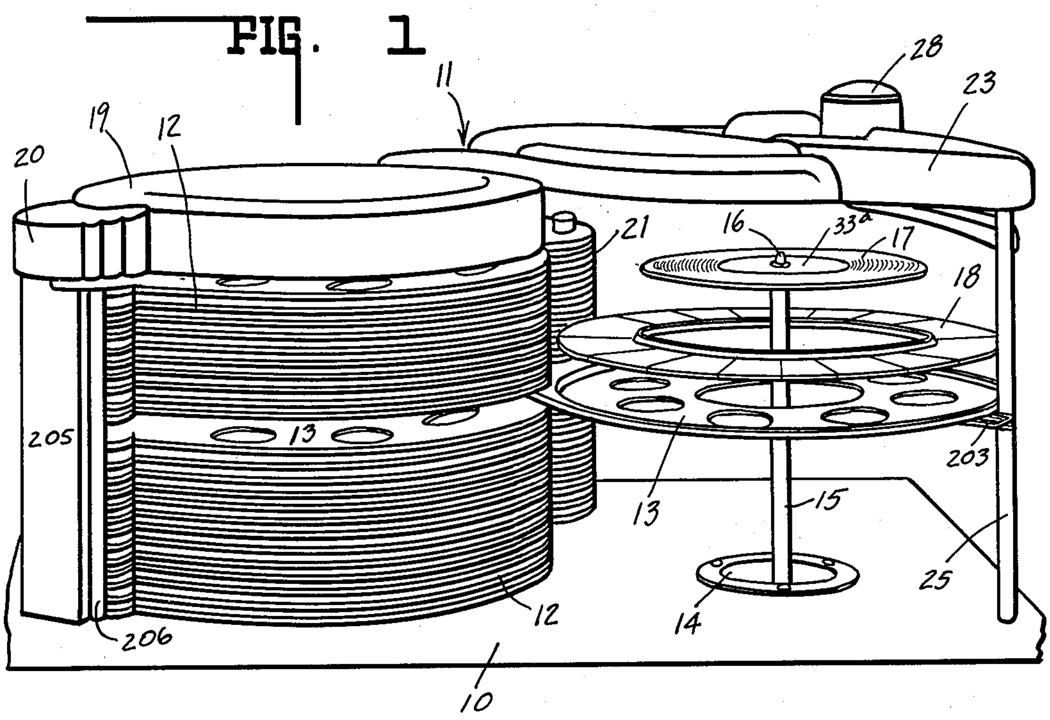
Fig. 1 is a perspective view showing generally the top side of the record receiving tray type of phonograph schematically viewed to illustrate a swinging tray for receiving a ten inch record adapted to present a seven inch record to the turntable.

In the drawings there is shown a phonograph of the swinging tray type above first referred to having a finish base 10 mounted upon a supporting base 10*a* carrying in spaced upward relation thereto a top trim casting 11. Mounted on the base 10*a* in column formation there is provided a record magazine indicated at 12, comprising a series of axially aligned superimposed record receiving and centering trays 13. Said base 10 is provided with an annular open recess 14 in which a turntable nests when in lowered position and through which the turntable spindle 15 extends when elevating the turntable to record playing position. The turntable is adapted to receive and rotatably support in centering position thereon through the medium of the centering pin 16, a phonograph record 17 of either seven inch or ten inch diameter. As shown in Fig. 1, the turntable supports a seven inch record which is centered on the tray 13 through the medium of an adaptor 18.

Figure 9:
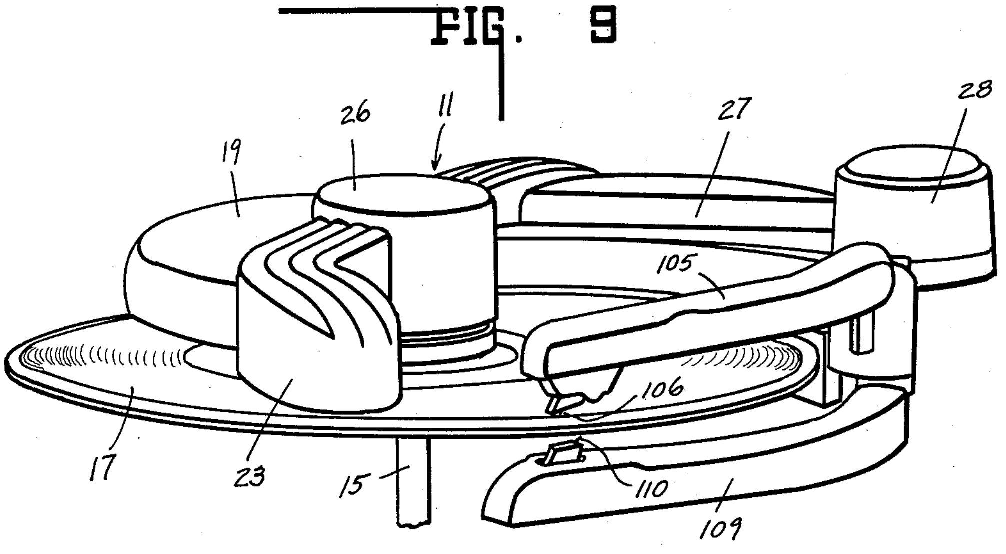
Fig. 9 is a perspective view of the dual opposed tone arms in position for record engagement by the upper tone arm.
Figure 2:
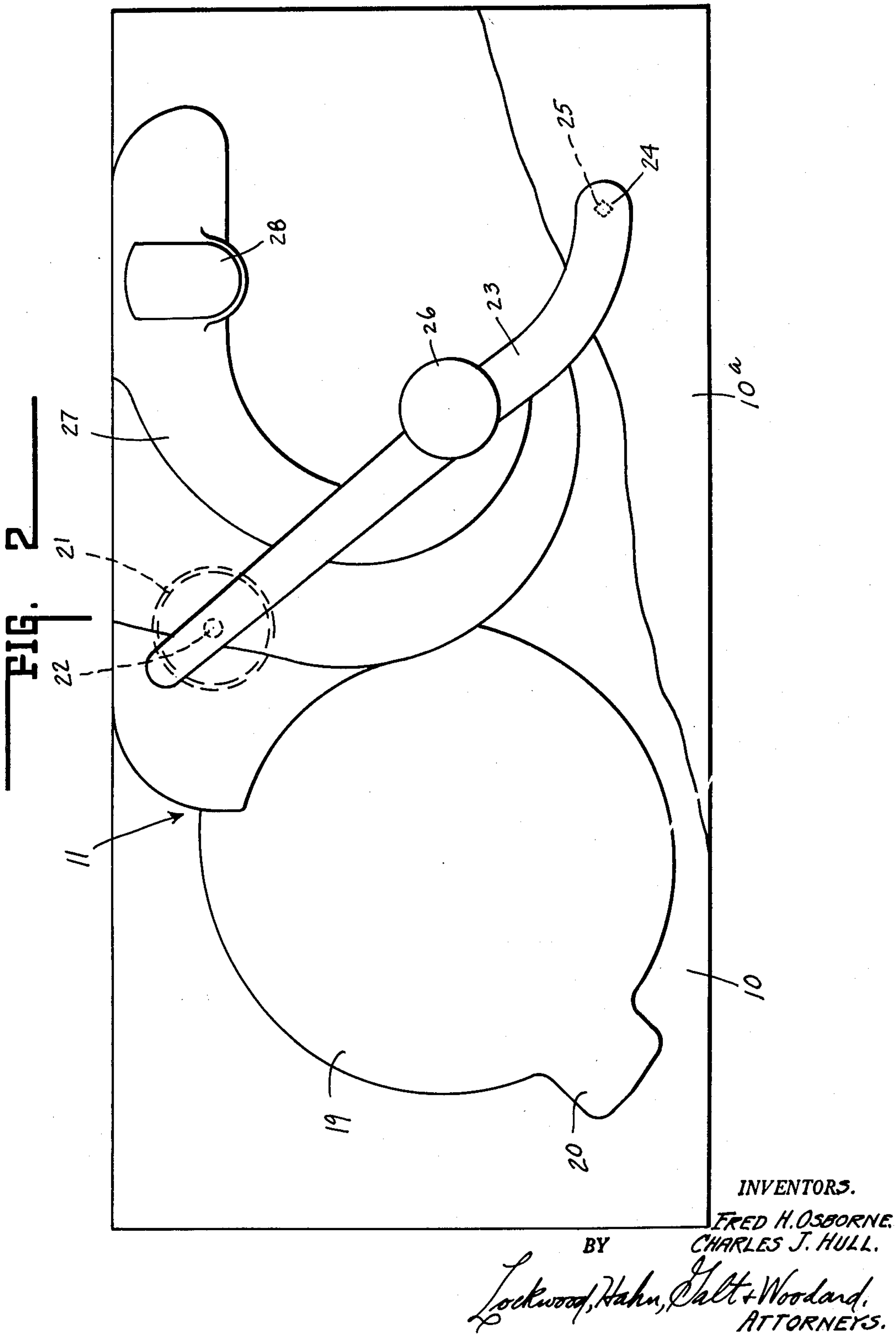
Fig. 2 is a plan view showing the upper structure of the phonograph with parts removed.
Figure 3:
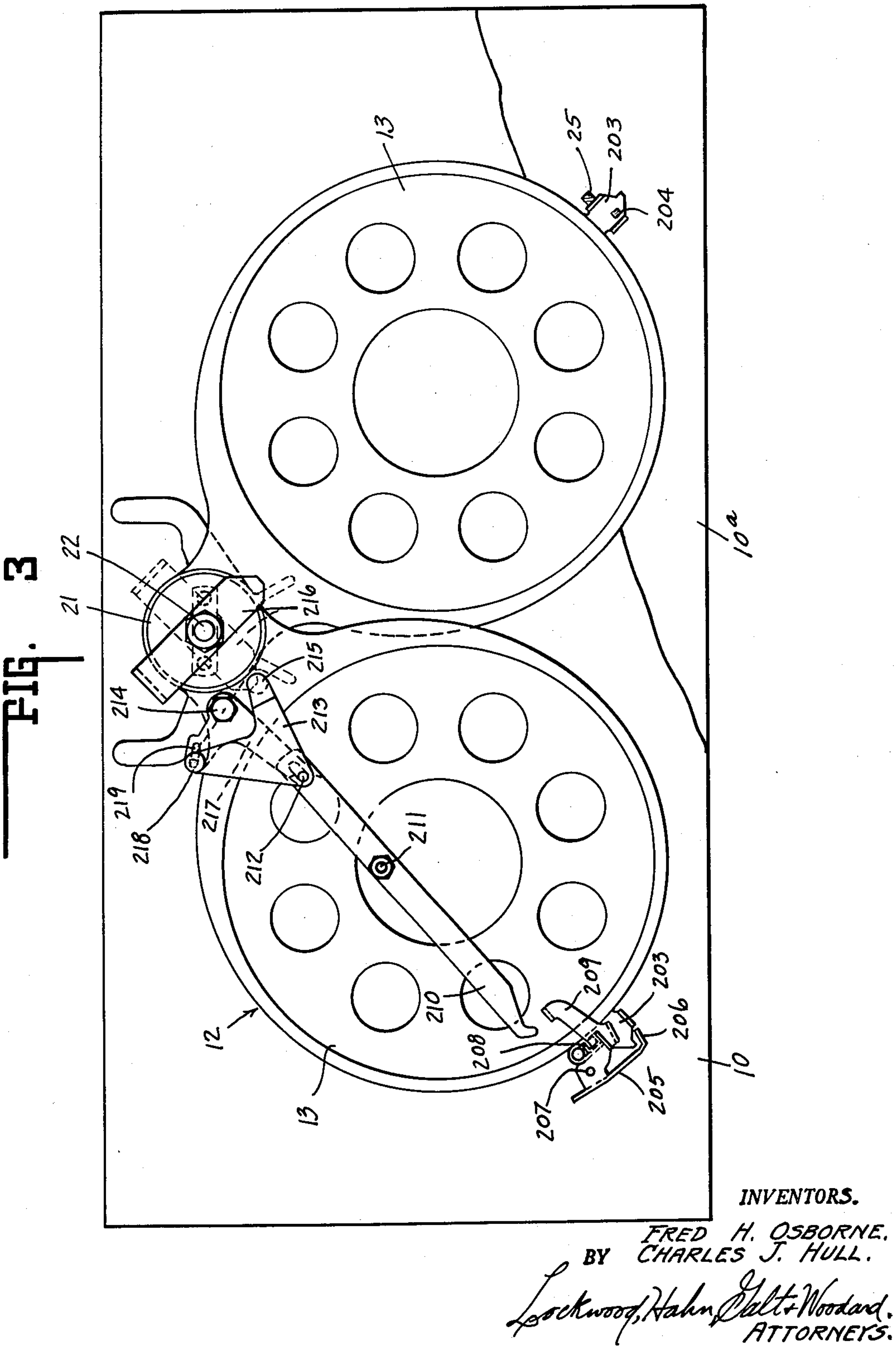
Fig. 3 is a plan view of the magazine with a selected tray swung into turntable alignment.
Figure 4:
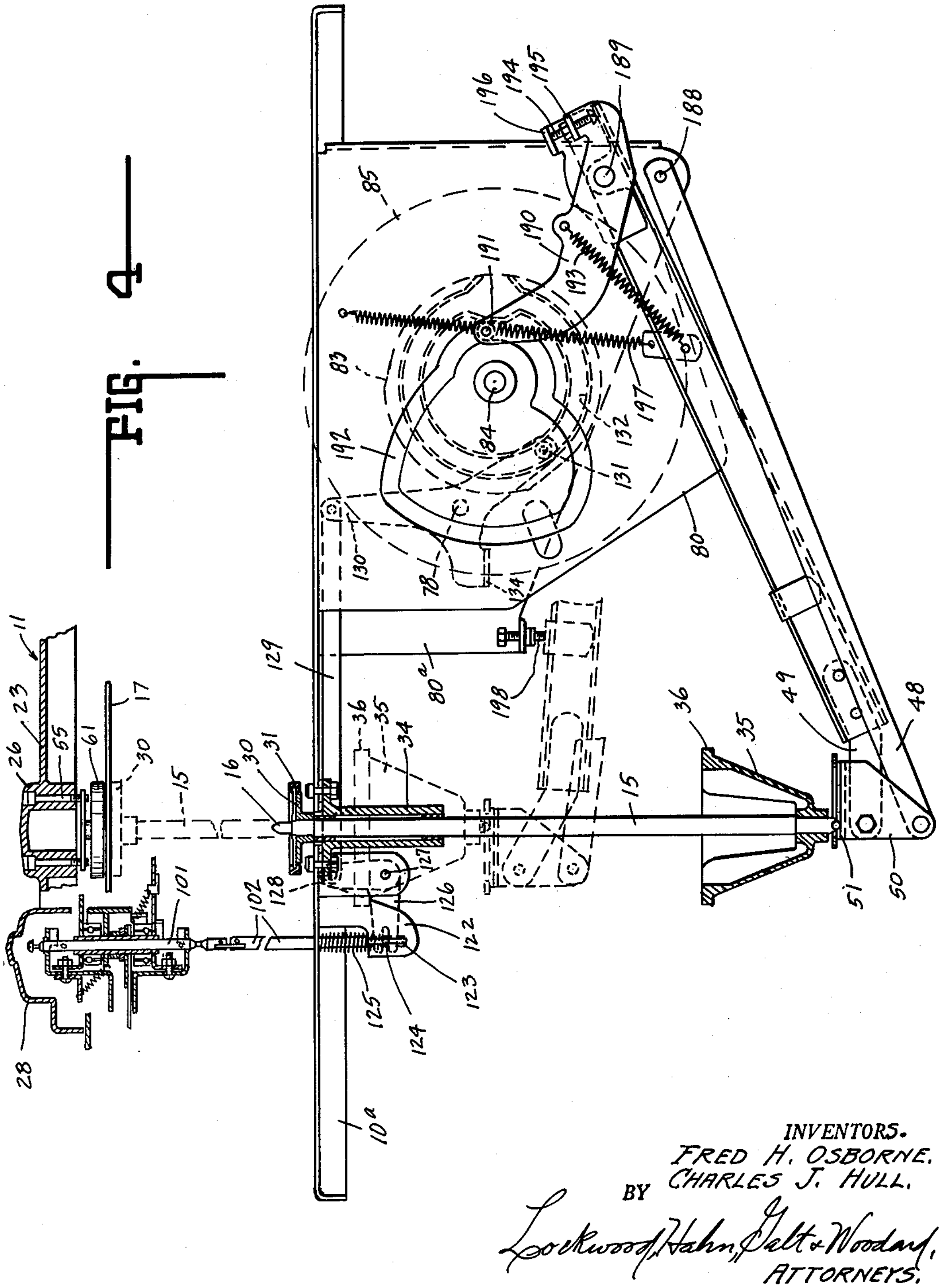
Fig. 4 is a side elevation of a portion of the driving mechanism for raising and lowering the turntable and selecting a tone arm for record engagement.
Figures 8, 10:
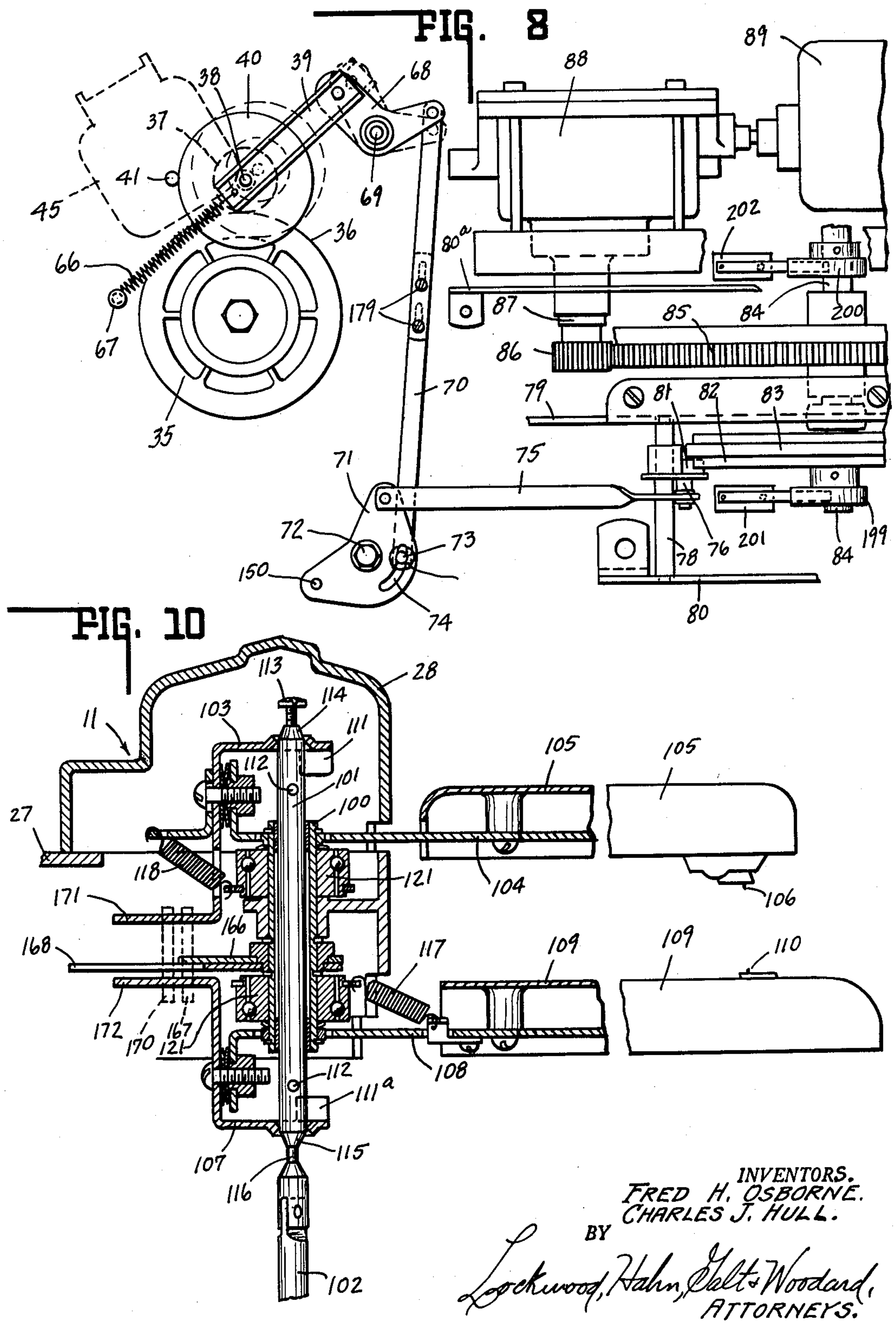
Fig. 8 is a plan view of the turntable driving mechanism, and the drive for the record changing mechanism shown schematically.
Fig. 10 is a section through the tone arm control mechanism.

As shown in Fig. 2, the top trim casting 11 includes an annular top cover 19 extending over the magazine 12 and having a laterally-extending boss 20 positioned over the tray locking mechanism shown in Fig. 3, the trays being mounted for lateral swinging movement on the post 21 to swing about an axis indicated at 22 from the magazine column laterally to turntable engaging position, as shown in Fig. 3. The top trim casting 11 also carries an arm 23 having its far end supported at 24 by a leg support 25, said arm carrying a top stabilizing bearing housing 26 shown in Figs. 4 and 6. A branch arm of said casting indicated at 27 carries a housing 28 for the tone arm control mechanism, as shown in Figs. 4, 9 and 10.

*Turntable elevating mechanism*

Figure 6:
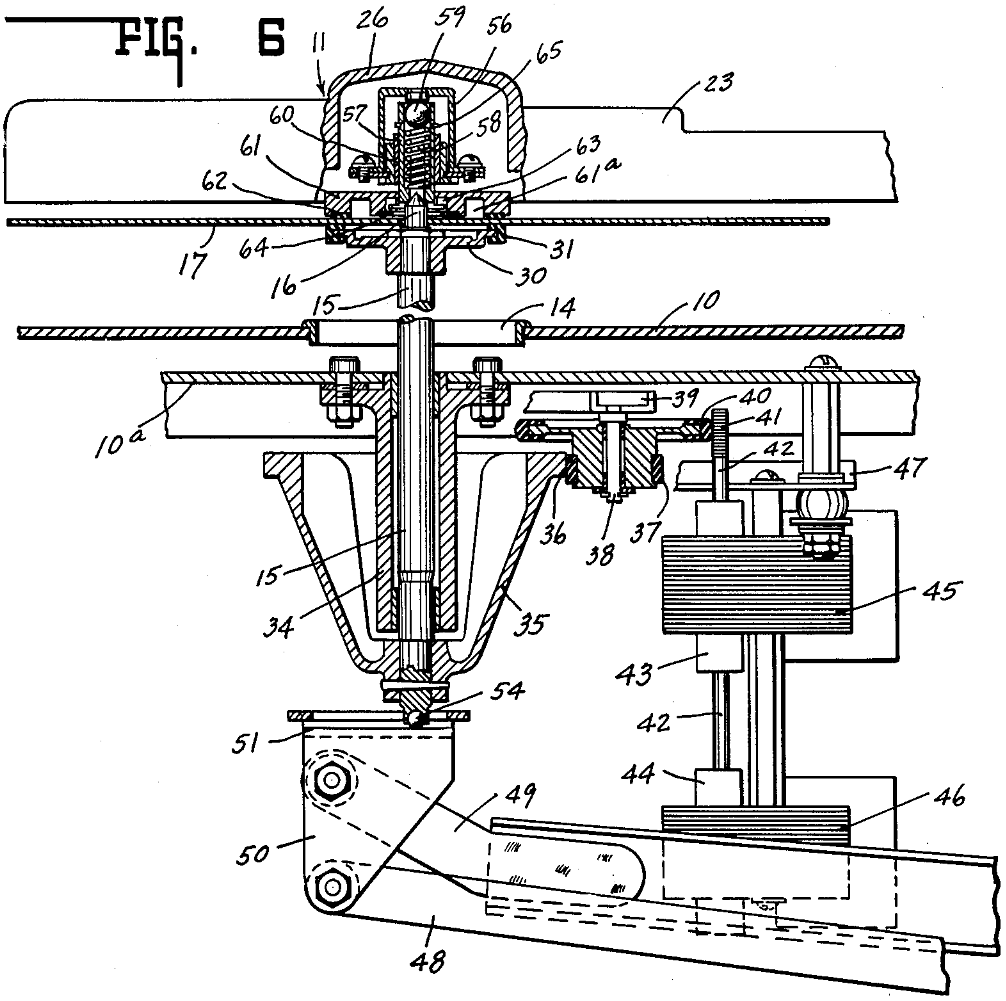
Fig. 6 is an enlarged sectional view with portions in elevation showing the turntable drive, upper and lower turntable spindle bearings, and a record clamping weight securing a ten inch record in playing position.

Referring to Fig. 6 there is provided a turntable comprising a record driving disk 30. Said turntable is of considerably reduced diameter as compared with the usual turntables, having no greater diameter than the central non-playing surface of the record, so that all the playing surface of the record will be exposed for reproduction on the underside thereof. As a part of the turntable there is provided an annular rubber rim 31 upon which the record seats. The turntable is carried on the upper end of the turntable spindle 15, the upper tip end of the spindle terminating in the centering pin 16 for extending through the center opening of the usual ten inch record.

The base plate 10*a* carries an elongated depending bearing 34 in which the spindle rotates. Keyed to the lower end of the spindle there is provided an inertia driving member 35 having some substantial weight and flaring upwardly and outwardly, terminating in an annular friction rim 36. Said rim 36 is adapted to be engaged by a rubber rimmed idler wheel 37 carried by a spindle 38 mounted on a control arm 39. Said idler wheel is provided with a laterally-extending flange having a rubber friction rim 40 adapted to be brought into frictional driving engagement with a coiled spring surface 41 of the motor driving shaft 42. Said shaft is jointly carried by the vertically aligned rotors 43 and 44 driven by the reversely wound motors 45 and 46, respectively. Said motors are supported on the base plate by a bracket mounting 47. This arrangement is such that when the upper motor 45 is energized, the turntable will be driven in one direction, for example, clockwise for reproducing the upper side of a record, and when the lower motor 46 is energized it will drive the spindle in the reverse or counterclockwise direction for reproduction of the lower side of the record.

The turntable spindle is raised and lowered by the parallelogram arms 48 and 49 having their ends pivotally connected to the turntable lift 50. The lift 50 is provided with an upper bearing plate 51 on which the lower end of the spindle travels as the lift swings up and down through an arcuate path. The lower end of the spindle is provided with a ball thrust bearing 54 riding on the bearing plate 51.

Mounted in the top stabilizing bearing housing 26 of the arm 23 and secured thereto by the bolts 55 (Fig. 4) there is a fixed bracket 56 mounting a rotative thimble 57 in the mouth of which the centering pin 16 is adapted to engage and be stabilized. Said thimble carries an internal compression spring 58 bearing against a ball thrust bearing 59 which in turn bears against the top of the bracket 56. Thus, as the spindle is raised to its uppermost position the centering pin enters the mouth of the thimble, forcing it upwardly against tension of the spring 58 to effectively align and retain the spindle to thereby eliminate wobble. The thimble 57 is freely slidable in the bearing members 60 mounted in the bracket.

Due to the extremely small diameter of the turntable or driving disk 30, to enable reproduction of the underside of the record it is necessary to securely clamp the upper side of the record on the turntable due to the thrust on the underside of the record during play by the lower reproducer. For this purpose there is provided a weighted disk 61 having a rubber friction surface 62 engageable with the top surface of the record in direct opposition to the disk 31 of the turntable. The weighted clamping disk 61 is provided with bosses 63 of substantial length engaged in slots 64 cut into the flange of the thimble 57, said bosses being freely slidable in said slots. With this arrangement the weighted disk is suspended from the thimble which in turn is suspended from the bearing 60 and retained by spring ring 65 thereon when the turntable is in lowered position. Upon the turntable being raised with a record thereon to its uppermost playing position, the record is first brought into engagement with the weighted disk and then its centering pin enters the spindle, compressing the spring and thereby providing a yielding upper thrust bearing therefor. The weighted disk, however, is not raised against the bracket, but to compensate for the thickness of the record affects its gripping and holding action merely by the weight thereof, so that there would be no danger of the record being fractured.

Figure 5:
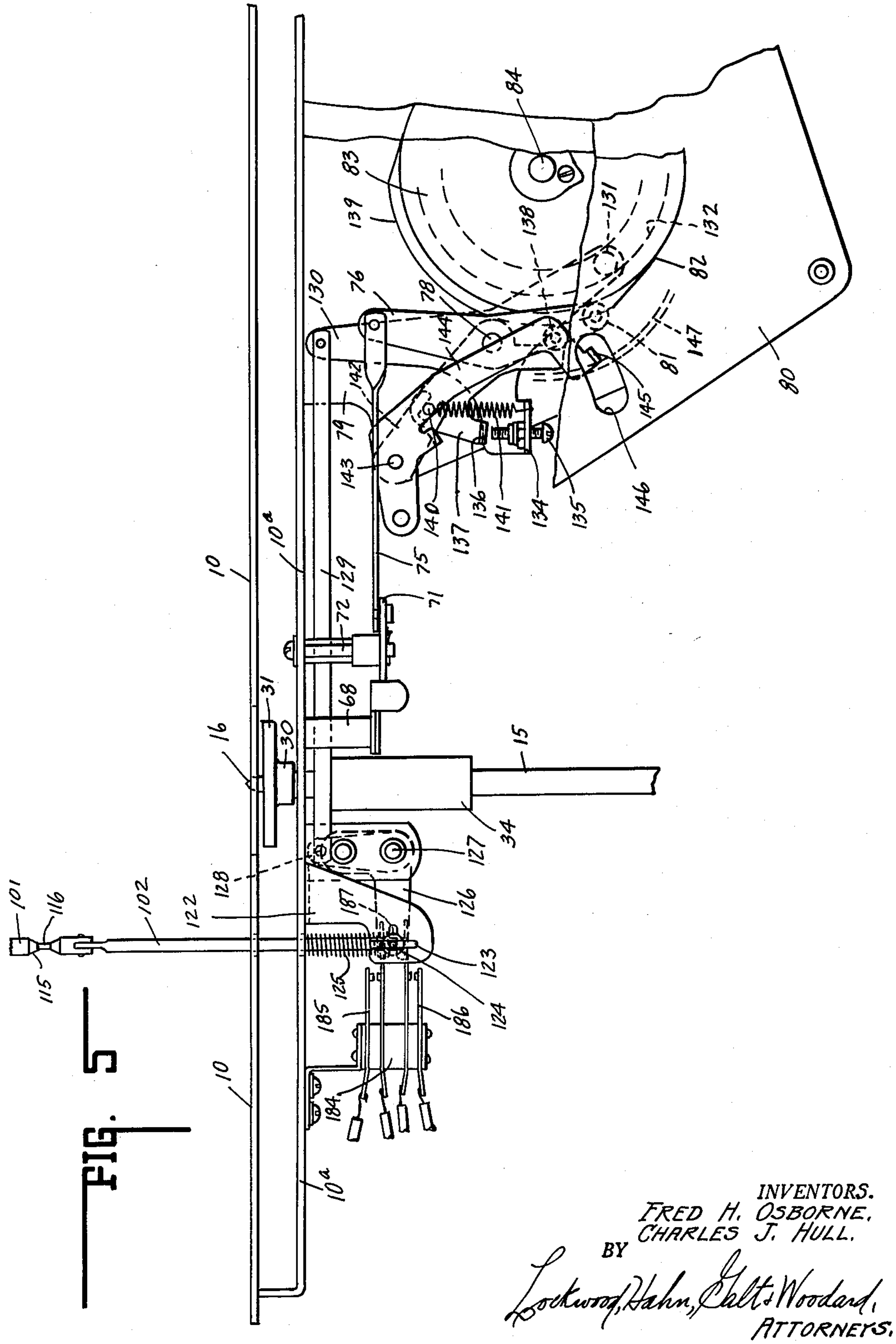
Fig. 5 is a side elevation of said mechanism showing that portion of the mechanism controlling the tone arm selection and direction of rotation of the turntable.

With respect to driving the spindle and turntable, reference is made to Figs. 6 and 8, wherein the control arm 39 mounts the idler wheels 37 and 40. The free end of the control arm is connected by a tension spring 66 with the base plate 10*a*, as indicated at 67. The opposite end thereof is pivotally connected to a bell crank lever 68 fulcrumed to the base plate 10*a* at 69. The opposite end of the bell crank lever is pivotally connected by an adjustable link 70 to a bell crank lever 71 fulcrumed to the base plate 10*a* at 72. Connecting link 70 is provided with a pin 73 slidable in an arcuate slot 74 of the bell crank lever. The bell crank lever is pivotally connected with a link 75 having its opposite end pivoted to a bell crank lever 76, as shown in Fig. 5, which bell crank lever is fulcrumed on a post 78 extending between a pair of spaced supporting plates 79 and 80, which plates are secured to the base plate 10*a* and extend vertically downward therefrom. The free end of the bell crank lever 76 is provided with a roller 81 in the form of a cam follower controlled by a cam track 82 on a cam 83. The cam 83 is secured on a main cam shaft 84 driven by a gear 85 from a pinion 86 mounted on the end of a cam driving shaft 87 extending from a reduction gear box 88 through which the record changing mechanism is driven in timed relation through one record changing cycle by the record changing motor 89, said gear reduction box and motor being diagrammatically indicated in Fig. 8.

The cam follower 81, which actuates the turntable drive mechanism, shown in Fig. 8, rides upon the cam profile 82 (Fig. 5) which is so related in timed relation to the record changing cycle that it permits the spring 66 to draw the idler driving wheels 37 and 40 into simultaneous engagement with the turntable driving member 35 and the motor shaft 41 at the record playing position of the record changing cycle. At this time the turntable will have been raised to its uppermost position, presenting a record to the reproducer. Upon completion of the reproduction of the record the cam shaft 84 is driven to start the next portion of record changing cycle, whereupon the cam profile 82 acts to withdraw the idler wheels from driving engagement against the tension of spring 66. Thereupon the turntable driving member 35 is lowered to the position shown in Fig. 4.

Figure 7:
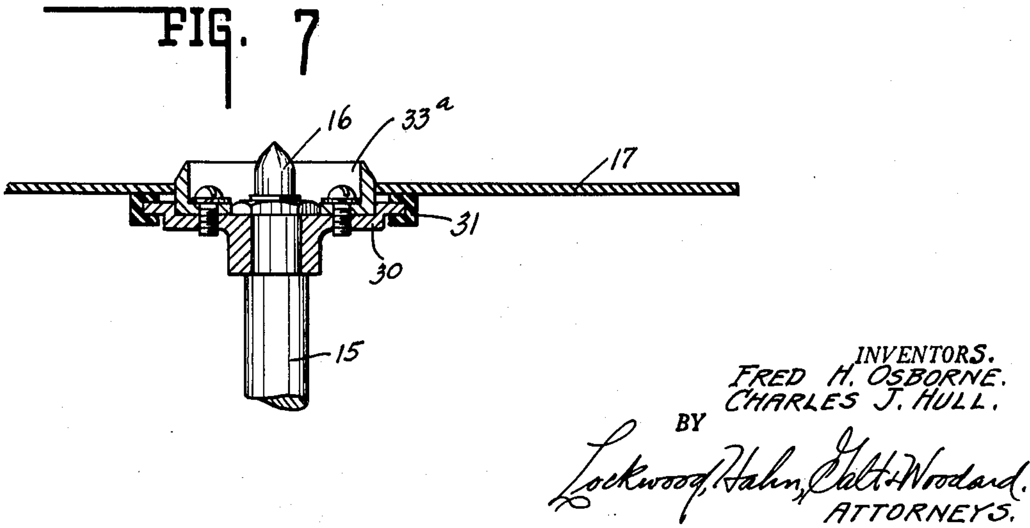
Fig. 7 is a section through the turntable carrying a seven inch record with a seven inch record adaptor mounted thereon.

*Change of record speed*

Wherein it is desired to change the record speed as between 78, 45 and 33⅓ R. P. M., it is only necessary to substitute the proper idler wheel assembly 37, 40 on the spindle 38. Through the use of wheels of different diameter the R. P. M. of the record rotation is readily selected according to the type of record to be reproduced.

Wherein it is desired to reproduce records of the RCA seven inch type, as shown in Fig. 7, the centering adaptor 33*a* is secured to the turntable 30 to surround the centering pin 16. This adaptor is of the proper diameter to extend through the enlarged opening of the seven inch record, serving precisely the same purpose as the centering pin 16 in respect to a ten inch record. The upper periphery of the adaptor is adapted to extend into the annular recess 61*a* of the weighted disk 61 so that the said weighted disk will clamp the seven inch record on the turntable in the same manner as above described in respect to the ten inch record. Fig. 1 illustrates the use of the adaptor 18 which acts to center the seven inch record on the ten inch record tray 13 for reception of the turntable centering adaptor 33*a*.

In playing ten inch 78 R. P. M. records, the entire magazine is supplied with such records which are supported and centered on the trays 13 and centered on the turntable by the centering pin 16. The proper diameter idler wheels for driving the turntable at 78 R. P. M. are mounted on the spindle 38. When it is desired to reproduce ten inch records at 33⅓ R. P. M., the magazine is supplied with said records which are likewise supported and centered on the trays 13 and centered on the turntable by the centering pin 18. Different turntable driving wheels are placed on the spindle 38, such as to drive the turntable at 33⅓ R. P. M. When it is desired to play seven inch records at 45 R. P. M., each of the trays 13 is supplied with an adaptor 18 and the seven inch records are thereby supported and centered to be picked up by the enlarged centering pin 33*a* on the turntable. At the same time the proper diameter turntable driving wheels are mounted on the spindle 38 such as to rotate the turntable at 45 R. P. M.

*Reproducer selection*

Figure 11:
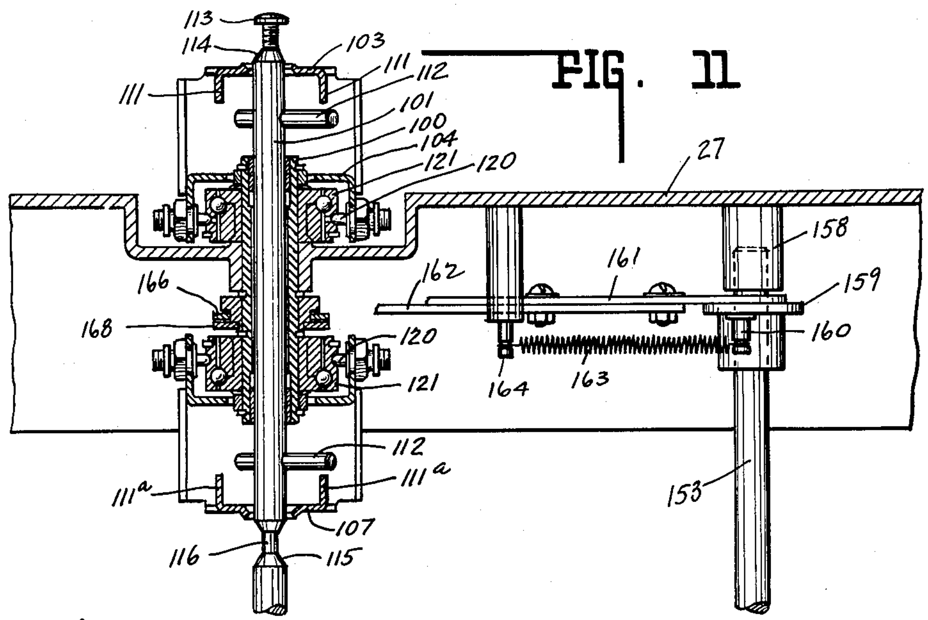
Fig. 11 is similar to Fig. 10, showing a section taken approximately at 90 degrees of the section shown in Fig. 10 through the tone arm control mechanism, parts in section and parts removed.
Figure 12:
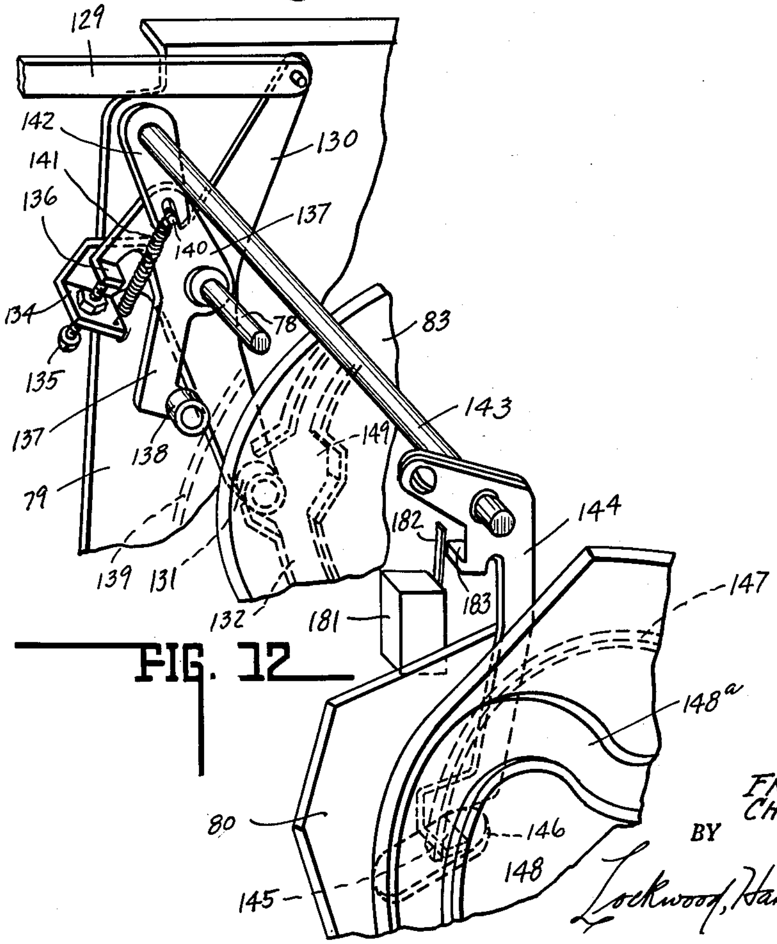
Fig. 12 is a perspective view of that portion of the mechanism controlling the selection of the tone arm and the control therefor.

The opposed tone arms and reproducers for selectively playing the upper or under sides of the records are shown in Figs. 10, 11 and 12. The top casting 27 supports a bearing sleeve 100 through which a tone arm shift rod 101 is vertically slidable, said shift rod being operated through a pivotal connection with an actuating rod 102. Pivotally mounted near the upper end of the shift rod there is a tone arm supporting bracket 103 supporting an upper tone arm plate 104 carrying a tone arm cover 105 and a depending reproducer 106 for engaging and reproducing the upper side of the record. Adjacent the lower end of the rod there is pivotally mounted a corresponding bracket 107 supporting a tone arm plate 108 carrying a lower tone arm cover 109 and an upwardly projecting reproducer 110 for engaging and reproducing the under side of the record. The upper bracket 103 is provided with a pair of downwardly extending ears 111, the lower bracket having corresponding upwardly extending ears 111*a*. Secured transversely of the rod adjacent said ears respectively there are locking pins 112.

At the upper end of the shift rod there is a stop screw 113 extending from a beveled surface 114 having camming engagement with bracket 103. At the lower end of the rod there is a similar beveled surface 115 positioned for camming engagement with the lower bracket 107. The body of the rod extends through and snugly fits in slidable relation with beveled openings in the respective brackets. Said brackets are so spaced in respect to the rod that when the rod is moved to intermediate neutral position, its body portion engages both brackets to thereby lock them against tilting movement. When the rod is lowered, the upper bracket rides down the beveled surface 114 so that the bracket 103, and, therefore, the upper tone arm, is freed to permit lowering thereof to playing position on the upper surface of the record. In this position the lower bracket is firmly held by the body of the rod below and in spaced relation to the under side of the record and pin 112 being brought into interlocking engagement with the ears 111*a*, it will be prevented from swinging inwardly of the record.

When the shift rod is moved to its uppermost position, the bracket 103 with the upper tone arm will be locked in position with the tone arm above and out of engagement with the top surface of the record while the lower bracket is freed due to the reduced portion 116 of the rod being positioned in the opening of the bracket. At the same time the upper arm will be locked against swinging movement inwardly of the record by interlocking engagement between the upper pin 112 and the bracket ears 111. Freeing of the lower bracket 107 permits the lower tone arm to be raised into playing engagement with the under side of the record under tension of a spring 117. A spring 118 connected with the upper bracket 103 acts in the nature of a counterbalance spring serving to counterbalance the weight of the freed tone arm to lighten its reproducing engagement with the record.

From the foregoing, it will be observed that when the turntable is raised to present the record to the upper reproducer 106, it is unlocked by the lowering of the shift rod for free oscillation during the playing operation, while the lower reproducer is locked thereby from engagement with the record. When the under side of the record is selected to play, the shift rod is raised to free the lower bracket and tone arm for permitting it to engage the under side of the record under tension of spring 117, while the upper tone arm is locked in position above and slightly out of engagement with the record. Each of the tone arms and their control brackets are provided with a swivel mounting 120 (Fig. 11) on the outer ball race of a ball bearing 121, respectively, whereby each of the tone arms is permitted to oscillate vertically and swing horizontally about the bearing sleeve 100.

The shift rod 101 is raised and lowered by the actuating rod 102, as shown in Fig. 5. Depending from the base plate 10*a* there is a bracket 122 having a vertical guide slot 123 therein for slidably receiving a cross pin 124 mounted on said rod. Intermediate the cross pin and base plate the rod is provided with a compression spring 125 normally urging it to its lowermost position. Extending into engagement with the cross pin on the rod there is a bifurcated end of a bell crank lever 126 fulcrumed at 127 through an elongated supporting bearing carried by the base plate. Pivotally connected at 128 with the upper end of the bell crank lever there is a link 129 pivotally connected at its opposite end to a bell crank lever 130. The bell crank lever 130 is fulcrumed on the post 78. The other end of the bell crank lever is provided with a cam follower roller 131.

The cam follower roller 131 rides in a cam groove 132 in the cam wheel 83 secured to the cam shaft 84 making one revolution during each record changing cycle (see Figs. 5 and 12). Said bell crank lever 130 is provided with a laterally-extending ear 134 carrying an adjusting screw 135 engaging a projection 136 of an actuating bell crank lever 137 likewise fulcrumed on the rod 78. The free end of the bell crank lever 137 is provided with a cam follower roller 138 positioned to be periodically engaged during the record changing cycle by a profile 139 of the cam 83. As shown in Fig. 12, the roller is free of the cam, said profile being indicated by dotted lines.

Said lever 137 is provided with an anchor pin 140 to which one end of a tension spring 141 is secured, the other end of said spring being secured to the ear 134 of the lever 130. Said pin 140 is embraced by the bifurcated end of a lever arm 142 which is secured to a transverse actuating rod 143 pivotally mounted between the supporting plates 79 and 80. The far end of the rod 143 has secured thereto a lever 144 provided at its free end with a hook shaped finger 145 extending through and movable in an elongated slot 146 in the supporting plate 80. Said lever and finger are positioned to be swung in a clockwise direction through the tension of the spring 141 overcoming the tension of spring 125 (Fig. 5), and positively moved in a counterclockwise direction through engagement of the roller 138 by the cam profile 139.

The selector cam 148 is driven in the manner described in the above Letters Patent by a gear segment and arrested at a selected position according to the record to be selected. A record selecting lever controlled by said selector cam positions the take out mechanism for a record tray, as shown in Fig. 3. The cam groove **148*a* controlling said selecting lever is generally heart shaped and is so related to the record take-out mechanism as to position the take-out for swinging one of twenty-four record containing trays 13** during the half revolution or throughout the distance of one-half the heart shaped cam groove, and the same trays in their order during the second half revolution or throughout the opposite half of the heart shaped selector cam groove.

To determine whether the upper or under side of the record is to be reproduced, the selector cam is provided with a cam wall 147 on the reverse face of the cam extending about one side thereof or through an arc of approximately 180 degrees. When a record is selected through the actuating and positioning of the heart-shaped selector cam, the under side of the selected record will be reproduced if the cam wall 147 is moved to a position to limit the clockwise movement of the finger 145, as shown in Figs. 5 and 12, and lever 130 is moved in a clockwise direction by tension of the spring 141. On the other hand, if the same record is selected from the opposite side of the heart shaped cam about which the wall 147 does not extend, then the upper side of said selected record will be reproduced due to freedom of the finger 145 to swing clockwise. Such freedom of the finger 145 permits the spring 125 (Fig. 5) to move the shift rod 102 downwardly to play the upper side of the record, due to relaxing of the spring 141 against the stop screw 135 upon the follower 131 entering the enlargement 149 in the groove 132 of cam 83.

During the record changing cycle the shift rod is held in neutral position, as shown in Fig. 10, retaining both tone arms in non-playing position. For this purpose, during the record playing cycle, the cam follower roller 131 on the bell crank lever 130 rides in the neutral cam groove 132. When the record changing cycle reaches record playing position, the cam 83 is arrested with the enlargement 149 positioned to permit the cam follower roller of the lever 130 to swing inwardly or outwardly, thereby causing the shifting of the shift rod 101 downwardly or upwardly, respectively, and then select the reproducer to be placed in playing position.

The conditioning of the lever 130 by the lever 144 occurs through oscillation of the rod 143 and arm 142 which permits spring actuation of the lever 130 to position a selected tone arm.

*Tone arm control*

During the record changing cycle it is necessary that both tone arms be held at one side clear of the record being raised by the turntable. This is accomplished by tone arm linkage controlled by a profile on the cam 83, best shown in Figs. 5, 13 and 14. For this purpose the linkage heretofore described in connection with the turntable drive is utilized, being connected with the tone arms in the following manner. As above set forth, the cam follower 81 rides on the profile 82 of the cam wheel 83, which profile is stepped inwardly at **82*a* and again further stepped inwardly at 82*b***.

During the major portion of the record changing cycle, the cam follower 81 is riding on the profile 82 which acts to hold the tone arms in their extreme outward position beyond the record periphery so as not to interfere with the raising and lowering of the record. As the cam wheel approaches the record playing position of the record changing cycle, the follower 81 moves into the stepped portion **82*a* causing both tone arms to swing inwardly and be positioned in line with the feed-in groove of the record. Upon passing into the portion 82*b* the selected tone arm will be free to feed in toward the center of the record during the playing operation. At this position, with the follower 81 in the portion 82*b*, the record changing mechanism comes to rest. Upon the completion of the playing of the record the cam is then moved to cause the cam follower to gradually swing back to the profile 82**, again swinging the tone arms to their outermost positions.

As above pointed out in respect to the turntable drive, when the cam follower 81 is in the portion **82*b* of the cam wheel during the record play, it permits the driving idler assembly 37, 40 to move into driving engagement with the turntable drive. But while the cam is riding on the outer profile 82 and in the portion 82*a***, the idlers are held out of driving engagement to permit the turntable to move to and from its lowered position.

Also, it is to noted that before the cam follower 81 is carried back from the portion **82*b* to the profile 82, the engaged reproducer will be disengaged from the record due to the follower 131 (Fig. 12) being moved into the neutralizing cam groove 132 of the cam wheel 83**.

Figures 13, 14:
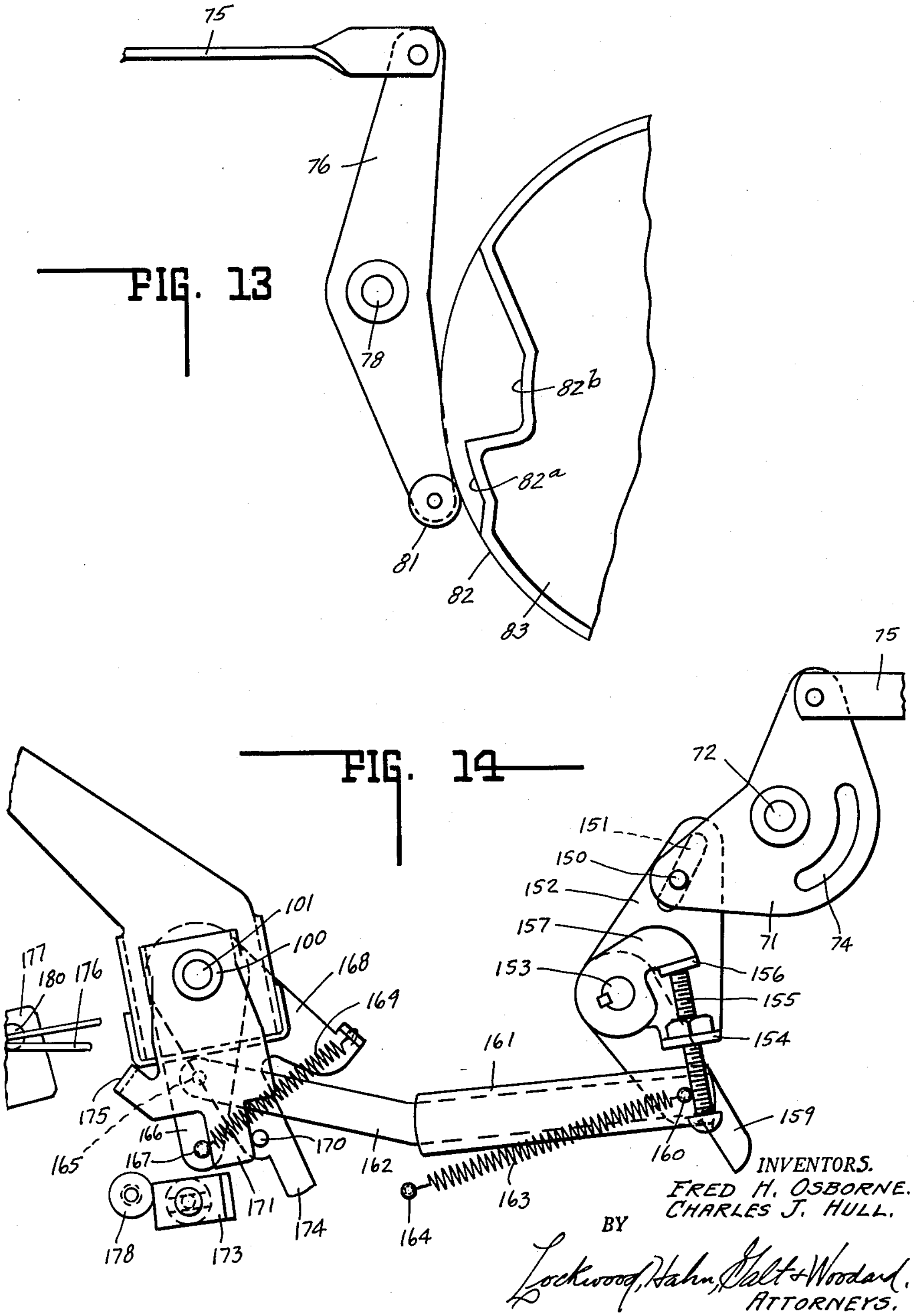
Fig. 13 is a side elevation showing a portion of the tone arm control cam.
Fig. 14 is a top plan view of a tone arm control linkage with the tone arms in their rest position clear of the records.

Referring to Figs. 8, 11 and 14, the bell crank lever 71 is provided with a pin 150 operating in the elongated slot 151 of an arm 152 pivoted to swing about a post 153. Said arm is provided with a head 154 carrying an adjustable screw 155 abutting a head 156 on a lever 157. The lever 157 is keyed to the post 153 near the lower end thereof below the base plate, which post is adapted to swivel between a boss 158 extending downwardly from the interior of the arm 27 and the base plate **10*a*. At the upper end of the post, adjacent the top trim arm 27 there is keyed an arm 159. The arm 159 has pivotally connected thereto at 160 spring loaded links 161, 162. Said lever 159 is urged inwardly by a tension spring 163 secured to pivotal connection 160 and a fixed pin 164 depending from the arm 27. The other end of the link 162 is pivoted at 165 to an arm 166 which in turn is pivoted at one end to swing freely about the bearing sleeve 100 in which the shift rod 101 operates. The free end of the arm 166 is provided with a guide pin 167** indicated by dotted lines in Fig. 10.

Associated with the lever 166 there is a second lever 168 spring loaded to the lever 166 in a manner to draw them toward each other by a spring 169. Said lever 168 is also mounted to swivel about the bearing sleeve 100 and lies against the lever 166. The outer end of said lever is provided with a guide pin 170 indicated by dotted lines in Fig. 10. The guide pins 167, 170 extend vertically above and below their respective levers in position for engaging the opposite sides of a rearwardly extending ear 171 on the upper tone arm and 172 on the lower tone arm. Also secured to the top trim arm 27 by a boss depending therefrom, there is an adjustable stop member 173 against which a finger 174 on the lever 168 is adapted to abut to free the reproducer ears 171, 172 when the reproducers have been moved to alignment with the starting groove of the record by the cam 83.

Both tone arms being positioned for the selected reproducer to engage the start of the record groove through the mechanism above described, the next step in the tone arm control is to lock the non-selected tone arm against inward swinging movement and free the selected tone arm. This is accomplished as above described, through interengagement with one or the other of pins 112 with the ears 111, 111*a*, respectively (Fig. 11). At this point in the sequence of operations the cam wheel 83 has reached the position shown in Fig. 12, and the selected reproducer has thereupon been either permitted to drop into engagement with the upper side of the record by the downward shifting of the shift rod 101 or the lower reproducer if selected is caused to move upwardly under tension of spring 117 upon the shift rod 101 being caused to shift upwardly, according to the conditioning of the lever 144 by the cam wall 147. Following the above, the selected tone arm is then freed to follow the inward path of the record groove. To accomplish this it is noted that the cam roller 81 (Fig. 13) has at this point dropped into the portion 82*b* of the cam profile 82 which, through the tension of spring 163, causes the link 75 to move to its extreme forward position (to the left in Fig. 14). This movement, through the linkage 71, 152, 153, 157, 159, 161 and 162 moves the pin 167 to the left of its position shown in Fig. 14 free and spaced from the ear 171 of the tone arm so as to permit freedom of movement of the tone arm as it feeds inwardly toward the center of the record following the groove.

Upon the reproducer reaching the trip position toward the end of the record groove, a tail projection 175 on each of the tone arms is brought into engagement with a trip 176 indicated diagrammatically in Fig. 14 for controlling the trip switch mechanism indicated at 177, in the usual manner, to set the record changing mechaism in motion for that portion of the cycle which brings the machine to rest. During such portion of the cycle the playing reproducer is moved free of the record by the shifting of the shift rod 101 through the action of the cam wheel 83 and cam follower 131 entering the neutral cam groove 132. The reproducer being thus disengaged from the record, the cam follower 81 rides up the cam profile 82 from the portion 82*b* which shifts the linkage of Fig. 14 in the opposite direction, causing the pin 167 to engage the ear 171 of the tone arm and swing it back to the position shown in Fig. 14. The reproducers are then positioned to one side clear of the record to permit the turntable to lower.

The above description of the positioning of the tone arm applies to the ten inch record. Wherein seven inch records are to be reproduced, the magazine is loaded with such records and the adaptor 18 is inserted in each tray 13 as well as the adaptor 33*a* being mounted on the turntable. Thereupon, the adjustable screw 155 is reset such as to cause the linkage to align the reproducers with the beginning of a seven inch record groove when the cam 81 passes into the stepped portion 82*a* of the cam 83. In addition, the stop 173 is reset on an adjacent boss indicated at 178 (Fig. 14) for feeing the ear 171 from the pin 170 at the playing position so that the tone arm may freely move into engagement with the record. It should further be noted that the rotating speed of the turntable is changed by replacing the idler assembly 37, 40 with idlers of proper diameter to rotate the turntable at the seven inch record speed.

In making the change of idlers for the change in speed it may be necessary to effect an adjustment of the link 70 (Fig. 8) through the adjusting screws and slots 179. In this manner the speed and positioning of the tone arm at the beginning of the record is adapted to the playing of a seven inch record. Since the end of the playing groove of the seven inch record is of greater diameter than that of the ten inch record, the trip action for the tone arm must occur ahead of the tripping action for the ten inch record, as above described. Thus, a swivel adjustment about a pivotal mounting 180 is provided for the trip switch 177 to move it clockwise and thereby bring the trip lever 176 in a position to be engaged by the tail projection 175 at the completion of the feeding of the seven inch record.

*Reverse motor drive*

As above mentioned, the turntable is driven in a clockwise direction when the upper tone arm is selected for play and a counterclockwise direction when the under tone arm is selected. For this purpose reversely wound motors 45 and 46 are provided. The particular motor is selected through a control switch diagrammatically indicated at 181 in Fig. 12. Said switch is mounted on the plate 80 and has an actuating arm 182 in position to be engaged and actuated through a toe 183 on the lever 144. Since the lever 144 is affected by the selector cam wall 147 to condition the tone arm control mechanism for selecting the upper or lower tone arm, said lever correspondingly serves through action of the switch 181 to select one or the other motors 45, 46. Said switch 181 is electrically connected in a circuit to the motors 45, 46 so that when disengaged by the selector 144, the motor 45 is normally energized but said circuit may be changed to a circuit for energizing motor 46 to reverse rotation of the turntable upon said switch being actuated.

It may be further noted that in the usual manner it is desired to deenergize the reproducers during the record changing cycle and to selectively energize one or the other reproducer according to which side of the record is to be reproduced. For this purpose there is shown a switch box 184 (Fig. 5) mounted on the under side of the base plate 10*a*, carrying spaced contacts 185, 186, respectively, between which a roller 187 on the actuating rod 102 rides. When the shift rod 101 is moved upwardly to render the lower tone arm effective, the contact arms 185 are closed by the upward movement of the roller 187 to thereby energize the lower reproducer when it is positioned for play. When the shift rod 101 is moved downwardly to render the upper tone arm effective, the roller 187 closes the contact arm 186 to energize the upper tone arm. When the tone arms are neutralized during the record changing cycle by the intermediate position of the shift rod, the roller is centered between the contact arms so that both switches are open and no energizing circuit then passes to either reproducer.

*Turntable lift*

The above described turntable is raised and lowered through the parallelogram arms 48, 49, as shown in Fig. 4. The arm 47 is pivotally connected at 188 to the lower end of the plate 79 to swing thereabout. It is caused to swing about its pivotal connection through the lift 50 by extension of the arm 49 pivoted at 189 on said plate. Associated with the lever 49 there is a lifting arm 190 pivoted at 189 having a cam follower roller 191 operating in the turntable lift cam groove 192 on the main cam 85 (Fig. 9) rotating with the main cam shaft 84. The lever 49 and arm 190 are connected through a tension spring 193 and at their adjacent rear ends are held in relative adjustment by an adjusting screw 194 adjustable in a head 195 of the arm 190 to abut against a head 196 on the lever 49.

There is also provided an assisting tension spring 197 connected to the lever 49 at its lower end and at its upper end to the plate 80*a*. Thus, as the cam wheel 85 rotates, the cam groove 192 permits the springs 193 and 197 to raise the turntable to record playing position. Upon the completion of the playing of the record, said cam positively lowers the turntable through the interconnection of the abutting screw 194 and the cam actuated arm 190. The upper playing position of the turntable is adjustably set through an adjustable abutment screw engageable by a bracket on arm 49, as shown in Fig. 4.

*Record changing motor control*

As shown in Fig. 8, the cam shaft 84 carries a pair of cams 199, 200 secured thereto. Said cams are positioned to close a circuit through the switches 201, 202, respectively. The switch 202 controls the circuit to the motor 89 to stop the changer when the tone arms are in playing position, and the switch 201 controls the motor to stop at its rest position upon completion of the changing cycle. Thus, after the motor is energized to operate the phonograph, the record changer and, therefore, the record changing cam will be driven through a half revolution until the selected side of the selected record is engaged by the reproducer for play. Thereupon the circuit to the motor 89 through switch 202 is broken through engagement of the cam 200. At the completion of the playing of the record the motor 89 is energized through the trip switch 177 (Fig. 14), whereupon the record changer is driven through the second half revolution to return the played record to the magazine. At this point the circuit to the motor 89 is broken through the switch 201 being opened by the cam 199. The record changer then remains at rest until energized by a new coin operated selection in the usual manner.

*Tray interlock gate*

To prevent one of the trays 13 from inadvertently swinging from the magazine when a selected tray is moved into alignment with the turntable, such as to possibly extend into the path of travel of the turntable, there is provided an interlocking tray gate as shown in Fig. 3. Each of the trays has projecting from its forward edge an ear 203 having a detent 204 formed therein. At the extreme position of the tray when it is axially aligned with the turntable, the ear abuts agains the supporting post 25, acting as a stop bar (Fig. 1). When the tray is in the magazine 12 it is latched against swinging movement by a latch bar 205 extending throughout the full column of the trays in the magazine, as shown in Figs. 1 and 3. Said latch bar is provided with a keeper 206 which latches over and restrains movement of the trays through its engagement with the respective ears 203. The latch bar is fulcrumed on the top and bottom of a hinge bar 207 and is urged in latching position by a spring 208.

At the top of the latch bar there is an arm 209 projecting over the uppermost tray and positioned to be engaged by a releasing lever 210 fulcrumed at 211 to a boss depending from the top cover 19. The other end of the lever is pivotally associated at 212 with a bell crank lever 213 fulcrumed at 214 and having an actuating roller 215 engageable by a camming plate 216 pivoted to swing about the axis 22 of the post 21. Associated with the bell crank lever 213 there is a second bell crank lever 217 fulcrumed at 214 having an adjusting screw 218 adjustable in a slot 219 of the lever 213 for accurately positioning the releasing lever 210 in respect to the latch.

The latch 205 thereby locks all the trays in the magazine to prevent their swinging out when the phonograph is being moved about, and also locks all trays in the magazine after the selected tray has been moved out. Thus, the latch is released by the above described mechanism instantaneously as the selected tray is slightly moved out of the column, and immediately relatches all remaining trays. Similarly it is unlatched by the reverse movement of the camming latch 216 to permit return of a tray back to the magazine followed by immediate relatching.

The invention claimed is:

1. In an automatic photograph having a record changing mechanism including a selector cam for presenting a selected record to be reproduced and positioning a vertically movable turntable to engage a selected one of a plurality of records for elevation into playing position, the combination therewith of a pair of opposed tone arms, each tone arm being individually and selectively movable relative to the other into reproducer engagement and reproduction of a selected side of the selected record, a shift member normally positioned to retain said arms respectively free of record engagement and shiftable in opposite directions to free one of said tone arms and retain the other respectively, and linkage conditioned by the position of the selector cam and actuated by the record changing mechanism upon positioning the selected record for reproduction to shift said member for freeing a selected one of said tone arms to record reproducing position.

2. In an automatic phonograph having a record changing mechanism including a heart-shaped selector cam for presenting a selected record to be reproduced and positioning a vertically movable turntable to engage said record for elevation into playing position, half of said cam effecting selection of all records and the opposite duplicate half of said cam selecting the same records, the combination therewith of a cam wall extending about one of the duplicate sides of said selector cam, a pair of opposed tone arms individually and selectively movable relative to each other into reproducer engagement and reproduction of a selected side of the selected record, a shift member normally positioned to retain said arms respectively free of record engagement and shiftable in opposite directions to free one of said tone arms and retain the other respectively, linkage operably connected with said member for effecting the shifting thereof, a conditioning finger connected with said linkage controlled by said cam wall to determine the individual tone arm to be moved into record engagement, and means controlled by said record changing mechanism for actuating said linkage to shift said member upon a record being placed in playing position according to the conditioning thereof by said finger.

3. In an automatic photograph having a record changing mechanism including a selector cam for presenting a selected record to be reproduced and positioning a vertically movable turntable to engage a selected one of a plurality of records for elevation into playing position, the combination therewith of a pair of opposed tone arms individually and selectively movable relative to each other into reproducer engagement and reproduction of a selected side of the selected record, means for pivotally mounting each of said tone arms to swing in a vertical plane respectively, a shift rod having spaced camming surfaces terminating in opposed reduced portions and provided with an intermediate body portion, said body portion being normally positioned for engagement by both of said arms to hold them free of record engagement and adapted to be shifted downwardly to permit the uppermost tone arm to ride into the reduced portion thereof to effect freedom for record engagement while retaining the lower tone arm through said body engagement, and shiftable upwardly to retain the upper tone arm by said body engagement and free the lower tone arm for record engagement upon presenting the reduced portion of said member thereto, and linkage controlled by the position of the selector cam and actuated by the record changing mechanism upon positioning the selected record for reproduction to shift said member upwardly or downwardly to free the selected one of said tone arms to record producing position.

4. In an automatic phonograph having a record changing mechanism including a heart-shaped selector cam for presenting a selected record to be reproduced and positioning a vertically movable turntable to engage said record for elevation into playing position, half of said cam effecting selection of all records and the opposite duplicate half of said cam selecting the same records, the combination therewith of a cam wall extending about one of the duplicate sides of said selector cam, a pair of opposed tone arms individually and selectively movable relative to each other into reproducer engagement and reproduction of a selected side of the selected record, a support for pivotally mounting said reproducers independently of each other for swinging in a vertical plane into and out of playing engagement, a shift rod slidable in said support having an intermediate body portion extending through said tone arms for locking them against pivotal movement when in neutral position, said rod having reduced portions adjacent each tone arm for freeing a selected one of said tone arms upon said reduced portions being brought into alignment therewith while retaining the other tone arm in locked position by said body portion, linkage connected with said shift rod having a cam follower, a neutral cam groove in said record changing mechanism in which said follower is adapted to ride to retain said shift rod in neutral position during a record changing cycle, said neutral cam groove having an enlarged portion to free said cam follower following a record changing cycle with the record in playing position, and a conditioning finger operably connected with said linkage and cam follower controlled by the wall of said selector cam for causing said follower to move radially inwardly or outwardly relative to said neutral cam groove according to the position of the selector cam, whereby upon one side of the heart-shaped selector cam being presented to said finger said follower will move to shift said rod in one direction and shift it in the opposite direction when the opposite side of said heart-shaped selector cam is presented.

5. In an automatic phonograph having a record changing mechanism including an actuating cam for presenting a selected record to be reproduced and positioning a vertically movable turntable to engage said record for elevation into playing position, the combination therewith of a pair of opposed tone arms mounted for independent movement, means for individually moving a selected one of said tone arms to position for engaging and reproducing a selected side of the selected record, a cam profile on said actuating cam having inwardly stepped portions, a cam follower therefor, and linkage between said follower and tone arms to normally retain them in their outermost position beyond the periphery of the record during the record changing cycle, swing them inwardly of said periphery to initial position for record engagement upon said follower entering the first said stepped portion and actuating said tone arm moving means to free a selected tone arm for movement inwardly of the record upon said follower entering a second of said stepped portions while retaining the other of said tone arms in its said initial position.

6. In an automatic phonograph having a record changing mechanism including an actuating cam for presenting a selected record to be reproduced and positioning a vertically movable turntable to engage said record for elevation into playing position, the combination therewith of a pair of opposed tone arms, means for individually moving a selected one of said tone arms to position for engaging and reproducing a selected side of the selected record, a cam profile on said actuating cam having inwardly stepped portions, a cam follower therefor, linkage between said follower and tone arms to normally retain them in their outermost position beyond the periphery of the record during the record changing cycle, swing them inwardly of said periphery to initial position for record engagement upon said follower entering the first said stepped portion, and actuating said tone arm moving means to free a selected tone arm for movement inwardly of the record upon said follower entering a second of said stepped portions, and a locking element connected with said means for engaging and locking the other tone arm against swinging movement inwardly of the record when freed by said linkage.

7. In an automatic phonograph having a record changing mechanism including a selector cam for presenting a selected record to be reproduced and positioning a vertically movable turntable to engage a selected one of a plurality of records for elevation into playing position, the combination therewith of a pair of opposed tone arms individually and selectively movable to reproducer engagement and reproduction of a selected side of the selected record, means including linkage conditioned by the position of the selector cam and actuated by the record changing mechanism upon positioning the selected record for reproduction to move a selected one of said tone arms to reproducer engagement and free it for reproduction of the selected side of the selected record, a pair of reversely wound turntable driving motors, individual electric circuits for each said motor, means for effecting a driving connection between one of said motors and said turntable, a switch for controlling said circuits, and a member on said linkage for actuating said switch to selectively energize one of said motors for rotating said turntable in the direction according to the selected side of the record to be reproduced.

References Cited in the file of this patent

UNITED STATES PATENTS

| | | |
|---|---|---|
| 874,985 | O'Neill | Dec. 31, 1907 |
| 2,002,236 | Wilcox | May 21, 1935 |
| 2,043,789 | Ansley | June 9, 1936 |
| 2,063,573 | Yeider | Dec. 8, 1936 |
| 2,076,255 | Smythe, Jr. | Apr. 6, 1937 |
| 2,106,722 | Collison et al. | Feb. 1, 1938 |
| 2,302,503 | Proctor | Nov. 17, 1942 |
| 2,323,365 | Andrews | July 6, 1943 |
| 2,416,583 | Hartley et al. | Feb. 25, 1947 |
| 2,457,668 | Hart | Dec. 28, 1948 |
| 2,506,925 | Johnson | May 9, 1950 |
| 2,557,015 | Slater | June 12, 1951 |

FOREIGN PATENTS

| | | |
|---|---|---|
| 632,233 | Great Britain | Nov. 18, 1949 |